(12) United States Patent
Shimura et al.

(10) Patent No.: US 11,394,060 B2
(45) Date of Patent: Jul. 19, 2022

(54) BATTERY PACK CHARGE/DISCHARGE CONTROL DEVICE THAT SUPPRESS HEAT GENERATION WHEN INTERNAL SHORT CIRCUIT OCCURS IN A SECONDARY BATTERY

(71) Applicant: MURATA MANUFACTURING CO., LTD., Kyoto (JP)

(72) Inventors: Jusuke Shimura, Kyoto (JP); Natsuko Katase, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 177 days.

(21) Appl. No.: 16/594,559

(22) Filed: Oct. 7, 2019

(65) Prior Publication Data

US 2020/0036050 A1  Jan. 30, 2020

Related U.S. Application Data (63) Continuation of application No. PCT/JP2018/014783, filed on Apr. 6, 2018.

(30) Foreign Application Priority Data

Apr. 7, 2017  (JP) .............................. JP2017-076959

(51) Int. Cl.
*H02J 7/00* (2006.01)
*H01M 10/42* (2006.01)
*H01M 10/0525* (2010.01)
(Continued)

(52) U.S. Cl.
CPC ..... *H01M 10/425* (2013.01); *H01M 10/0525* (2013.01); *H01M 50/581* (2021.01);
(Continued)

(58) Field of Classification Search
CPC ............................ H01M 10/425; H02J 7/0026
(Continued)

(56) References Cited

U.S. PATENT DOCUMENTS 10,680,448 B2 *   6/2020   Yano ..................... H02J 7/0016
2003/0027036 A1   2/2003   Emori et al.
(Continued)

FOREIGN PATENT DOCUMENTS

| EP | 2 911 256 |   | 8/2015 |
|----|-----------|---|--------|
| GB | 2911256   | * | 8/2015 |

(Continued)

OTHER PUBLICATIONS

International Search Report and Written Opinion issued in connection with PCT Application No. PCT/JP2018/014783, dated May 22, 2018. (6 pages).

(Continued)

*Primary Examiner* — Yalkew Fantu
(74) *Attorney, Agent, or Firm* — K&L Gates LLP (57) ABSTRACT

Provided is a battery pack charge/discharge control device in which two or more secondary battery units are connected in parallel as a battery pack. The battery pack charge/discharge control device includes an output power maximization circuit configured to maximize an output power based on an input power, and a voltage adjustment converter configured to adjust an output voltage from the output power maximization circuit, and an output power of a secondary battery unit is maximized when the secondary battery unit is in a short circuit state.

17 Claims, 5 Drawing Sheets

(51) Int. Cl.
*H02H 3/02* (2006.01)
*H01M 50/581* (2021.01)

(52) U.S. Cl.
CPC ........... *H02H 3/023* (2013.01); *H02J 7/0026* (2013.01); *H02J 7/0031* (2013.01)

(58) Field of Classification Search
USPC ........................................................ 320/127
See application file for complete search history.

(56) References Cited

U.S. PATENT DOCUMENTS

| | | | | | |
|---|---|---|---|---|---|
| 2010/0194340 | A1* | 8/2010 | Lim | ................... | H01M 10/486 320/116 |
| 2011/0080143 | A1* | 4/2011 | Parakulam | .............. | H02M 1/32 320/162 |
| 2011/0273015 | A1* | 11/2011 | Adest | ..................... | H02J 1/102 307/43 |
| 2012/0038212 | A1* | 2/2012 | Arata | .................... | H02J 7/0016 307/46 |
| 2017/0285109 | A1* | 10/2017 | Kawamura | ........... | H02J 7/1423 |
| 2018/0358661 | A1* | 12/2018 | Yebka | ................. | H01M 10/425 |

FOREIGN PATENT DOCUMENTS

| | | |
|---|---|---|
| JP | H11-191436 A | 7/1999 |
| JP | 2009-087600 A | 4/2009 |
| JP | 2010-231939 A | 10/2010 |
| WO | 80/02778 | 12/1980 |

OTHER PUBLICATIONS

European Search Report dated Dec. 4, 2020 in corresponding European Application No. 18781339.9.
European Office Action dated May 13, 2022 in corresponding European Application No. 18781339.9.

* cited by examiner

BATTERY PACK CHARGE/DISCHARGE CONTROL DEVICE THAT SUPPRESS HEAT GENERATION WHEN INTERNAL SHORT CIRCUIT OCCURS IN A SECONDARY BATTERY

CROSS REFERENCE TO RELATED APPLICATIONS

The present application is a continuation of PCT patent application no. PCT/JP2018/014783, filed on Apr. 6, 2018, which claims priority to Japanese patent application no. JP2017-076959 filed on Apr. 7, 2017, the entire contents of which are being incorporated herein by reference.

BACKGROUND

The present disclosure generally relates to a battery pack charge/discharge control device, and more specifically to a battery pack charge/discharge control device capable of suppressing heat generation at the time of occurrence of internal short circuit in a secondary battery.

In recent years, because of the spread of electric cars and hybrid automobiles and the spread of power generation devices that require leveling because of unstable generated power, such as solar power generation or wind power generation, demand for various secondary batteries including a lithium ion secondary battery has been rapidly increasing.

Incidentally, in a secondary battery, when internal short circuit occurs because, for example, an external foreign object (e.g., a nail or a metal piece) is driven in, Joule heating is generated around a short-circuited portion. Then, depending on the state of generation of Jale heating, thermal runaway can occur in the secondary battery. The internal short circuit of the secondary battery due to such a foreign object can occur, for example, in a collision accident in the case of a secondary battery mounted in a mobile body, and can also occur when a foreign object falls onto the secondary battery in disasters, e.g., earthquakes.

SUMMARY

The present disclosure generally relates to a battery pack charge/discharge control device, and more specifically to a battery pack charge/discharge control device capable of suppressing heat generation at the time of occurrence of internal short circuit in a secondary battery.

In the conventional technology of the lithium secondary battery, the energy generated by the internal short circuit in the secondary battery is converted into heat, and a portion for discharge is merely shifted. There is no mention of suppression of amount of heat generation or effective use of the energy generated by the internal short circuit in the secondary battery.

Accordingly, it is an object of the present disclosure to provide a battery pack charge/discharge control device capable of suppressing heat generation when internal short circuit occurs in a secondary battery.

According to an embodiment of the present technology, a battery pack charge/discharge control device is provided. The battery pack charge/discharge control device is configured to charge/discharge a battery pack including two or more secondary battery units connected in parallel, the battery pack charge/discharge control device includes:

an output power maximization circuit configured to maximize output power based on an input power; and a voltage adjustment converter configured to adjust an output voltage from the output power maximization circuit, in which an output power of a secondary battery unit is maximized when the secondary battery unit is in a short circuit state.

In the battery pack charge/discharge control device of the present disclosure, an output portion of a secondary battery unit in an internal short-circuit state is turned into a maximum output power by the output power maximization circuit and is input to the voltage adjustment converter.

As a result, the energy released by the secondary battery unit in the internal short-circuit state is efficiently output from the voltage adjustment converter, and the amount of heat generated by the secondary battery unit in the internal short-circuit state can be reduced.

It should be understood that the effect described in the specification is a mere example, but is not limitative, and other suitable properties relating to the present technology may be realized and as further described.

DETAILED DESCRIPTION

A battery pack charge/discharge control device of the present disclosure is described below. The present disclosure will be described based on examples with reference to the drawings, but the present disclosure is not to be considered limited to the examples, and various numerical values and materials in the examples are considered by way of example.

The present disclosure relates to a charge/discharge control device for a battery pack. Therefore, the device of the present disclosure includes a battery pack and a charge/discharge control portion. The battery pack includes two or more secondary battery units, which are connected to each other in parallel. Each of the two or more secondary battery units includes one secondary battery or a plurality of secondary batteries connected in serial. That is, one or more secondary batteries constitute the secondary battery unit, and the secondary battery units are connected in parallel to constitute the battery pack. The charge/discharge control portion at least includes output power maximization circuit and a voltage adjustment converter. The output power maximization circuit is configured to maximize power, particularly the output power based on the input power. Therefore, the output power maximization circuit preferably functions when short circuit occurs in the secondary battery units of the battery pack. The voltage adjustment converter is a converter that can perform conversion into a desired output voltage, particularly can adjust the output voltage from the output power maximization circuit. Therefore, the voltage adjustment converter preferably functions at least when short circuit occurs in the secondary battery units of the battery pack.

In such a battery pack charge/discharge control device, even when short circuit occurs in the secondary battery units constituting the battery pack, the released energy of the secondary battery units in which short circuit has occurred can be extracted maximally. That is, when short circuit occurs in one of the two or more secondary battery units constituting the battery pack, the output power maximization circuit can maximize the output power based on the input power of the secondary battery unit in which short circuit has occurred, and the voltage adjustment converter can adjust the output voltage from the output power maximization circuit to a desired voltage suitable for extraction. As described above, in the battery pack charge/discharge control device of the present disclosure, the released energy of the secondary battery unit in which short circuit has occurred can be extracted maximally more preferably. Therefore, the energy can be used for charging the secondary battery units not in the internal short-circuit state or can be output to and used outside the battery pack. Note that the maximum output power from the short-circuited secondary battery unit can maximally reduce the amount of heat generation in the secondary battery unit in which short circuit has occurred, leading to a reduction in risk of fuming and fire of the secondary battery unit in which short circuit has occurred. In other words, it can be said that the battery pack charge/discharge control device of the present disclosure, even when the internal short circuit occurs, can reduce secondary risks resulting from the short circuit and effectively use the energy of the secondary battery unit in the internal short circuit. Moreover, in cases where, for example, the charge reaction of the secondary battery is endothermic reaction, when "maximized power of an internally short-circuited battery unit" is used for charging the secondary battery unit not in the internal short-circuit state, the heat released from the secondary battery unit in the internal short-circuit state is absorbed by the secondary battery being charged, and the total amount of heat generation released to the outside from secondary battery unit in the internal short-circuit state can be further reduced. In this case, the risk of fuming and fire of the secondary battery unit in which short circuit has occurred is further reduced.

Elements associated with the battery pack charge/discharge control device of the present disclosure are described. In the battery pack charge/discharge control device of the present disclosure, an output portion of the voltage adjustment converter may be in the form of being connected to an output portion of the battery pack. Then, in this case, the secondary battery unit not in the internal short-circuit state may be in the form of being charged by the output power from the voltage adjustment converter, and furthermore, in this case, an output voltage ($V_1$) of the voltage adjustment converter may be in the form of being equal to (or substantially equal to) a voltage ($V_2$) of the secondary battery unit not in the internal short-circuit state. Note that the value of $V_1$ is equal to (or substantially equal to) the value of $V_2$, but, in practice, in consideration of internal impedance of the circuit, the relationship of $V_1 > V_2$ or $V_1 \geq V_2$ can be satisfied.

The voltage adjustment converter is not particularly limited as long as it can perform conversion into a desired voltage. For example, the voltage adjustment converter may be a boost converter. That is, a converter provided on the battery pack charge/discharge control device may be those capable of setting the output-side voltage to be higher than the input-side voltage. Alternatively, the voltage adjustment converter may be a step-down converter. That is, a converter provided on the battery pack charge/discharge control device may be those capable of setting the output-side voltage to be lower than the input-side voltage. In a preferred aspect, such a voltage adjustment converter may be a so-called DC/DC converter. Moreover, the voltage adjustment converter may be a boost/step-down converter that can perform both boost and step-down.

In the battery pack charge/discharge control device of the present disclosure, the output portion of the voltage adjustment converter can be in the form of being connected to the outside of the battery pack.

In the battery pack charge/discharge control device of the present disclosure, the output power maximization circuit preferably has a maximum power point tracking (MPPT) control function. Alternatively, the output power maximization circuit preferably includes a hill climbing MPPT circuit. The MPPT control function or the MPPT circuit per se may be a well-known MPPT control function or a MPPT circuit. Note that MPPT is sometimes also called "MPPC".

In the battery pack charge/discharge control device of the present disclosure, the output power maximization circuit and the voltage adjustment converter are preferably integrated. However, it is not limited thereto, but the output power maximization circuit and the voltage adjustment converter may be separate components. The circuit constituting the voltage adjustment converter per se may be formed of a well-known circuit.

In the battery pack charge/discharge control device of the present disclosure, the secondary battery unit in the internal short-circuit state connected to an input portion of the output power maximization circuit can be in the form of being disconnected from the battery pack under a predetermined condition. Here, examples of the "predetermined condition" include that the value of the input power to the output power maximization circuit of the secondary battery unit in the internal short-circuit state becomes a predetermined value or less.

In the battery pack charge/discharge control device of the present disclosure, internal short-circuit detector that detects the internal short-circuit state of the secondary battery unit may be provided. Such internal short-circuit detector can include temperature detection means, specifically, for example, a thermistor or a thermocouple that detects the temperature of the secondary battery unit, or a thermistor or a thermocouple that detects the temperatures of the secondary batteries constituting the secondary battery unit. Alternatively, the internal short-circuit detector can include voltage measurement means that measures the voltage of the secondary battery unit or the voltages of the secondary batteries constituting the secondary battery unit. Furthermore, the internal short-circuit detector can include current measurement means that measures the current of the secondary battery unit.

In the battery pack charge/discharge control device of the present disclosure, switch means that switches an output destination of the secondary battery unit may be provided. This is particularly true in "the aspect in which the plurality of secondary battery units share one voltage adjustment converter" as will be described later. The switch means can include an electromagnetic relay or a solid state relay (SSR), which is a relay without a movable contact portion (non-contact relay), but is not limited thereto, and can include, for example, an FET. Note that the solid state relay may be a relay including a semiconductor switching element, such as a thyristor, a triac, a diode, or a transistor.

The battery pack charge/discharge control device of the present disclosure operates either during charging of the secondary battery or during discharging of the secondary battery. Moreover, the battery pack charge/discharge control device of the present disclosure includes a conventional control device (control circuit) that controls charging and discharging of the secondary battery or the secondary battery unit. The type of secondary battery per se is not particularly limited. Examples of the secondary battery for use in the battery pack charge/discharge control device of the present disclosure include a non-aqueous secondary battery, specifically, a lithium ion secondary battery. The charge reaction of the lithium ion secondary battery is endothermic reaction. Therefore, when the secondary battery unit not in the internal short-circuit state is charged by the output power from the voltage adjustment converter, the heat released from the secondary battery unit in the internal short-circuit state is absorbed by the secondary battery being charged. Thus, the total amount of heat generation released to the outside from the secondary battery unit in the internal short-circuit state can be further reduced. However, it is not limited to the lithium ion secondary battery, but other examples can include a magnesium ion battery, a metal-air secondary battery having an anode member containing an anode active material including metal and an alloy material (the metal and alloy material that can be used for the anode active material include, for example, tin, silicon; alkali metal such as lithium, sodium or potassium; group 2 elements such as magnesium or calcium; group 13 elements such as aluminum; transition metals such as zinc or iron; or an alloy material or a compound containing these metals), a lithium sulfur secondary battery, a sodium-sulfur secondary battery, a sodium-nickel chloride secondary battery, a sodium ion secondary battery, a multivalent cation secondary battery, various organic secondary batteries, and a nickel-hydrogen secondary battery.

The term "internal short circuit" regarding the battery pack charge/discharge control device of the present disclosure is used to broadly indicate a phenomenon in which the secondary battery unit is in a non-normal state out of a normal state in a broad sense. Therefore, the "internal short circuit" used in the specification comprehensively includes the meaning of various non-normal states in which the secondary battery unit is deemed to be in a typical abnormal/damaged state and not in a typical sound state.

The battery pack charge/discharge control device according to an aspect is described below in more details with reference to the drawings.

The charge/discharge control device of the present disclosure can be embodied in various aspects. For example, in the charge/discharge control device of the present disclosure, a plurality of secondary battery units may share one voltage adjustment converter. In particular, the plurality of secondary battery units may share one output power maximization circuit and one voltage adjustment converter. In a specific exemplary aspect, as illustrated in FIG. 1, a circuit configuration may be made in which two or more secondary battery units 20 can share single output power maximization circuit 30 and a single voltage adjustment converter 40.

Figure 6:
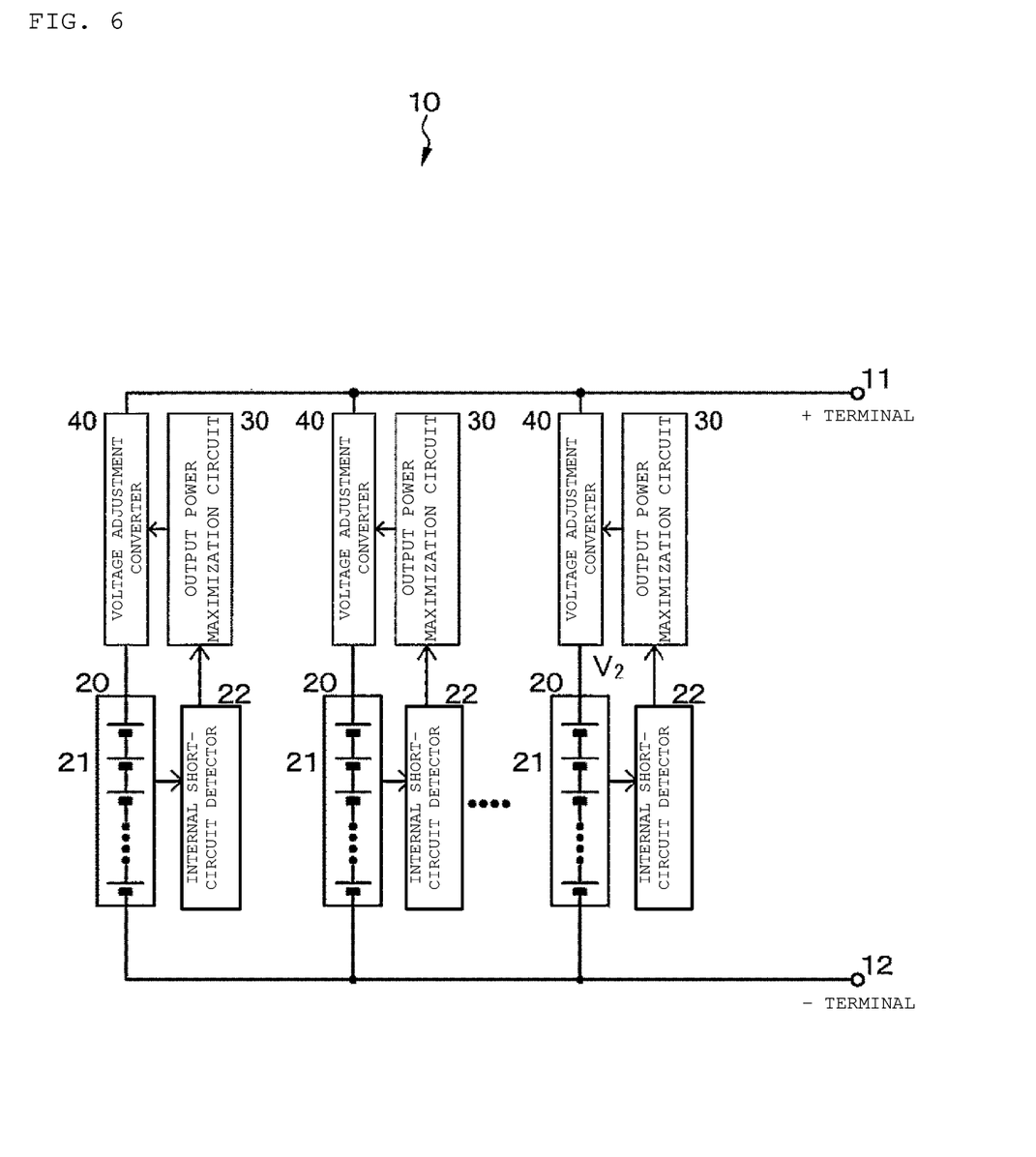
FIG. 6 is a diagram illustrating a circuit configuration of a battery pack charge/discharge control device according to an embodiment of the present disclosure.

Moreover, in the charge/discharge control device of the present disclosure, each of the plurality of secondary battery units may have a one-to-one corresponding voltage adjustment converter. In particular, each of the plurality of secondary battery units may individually include the output power maximization circuit and the voltage adjustment converter. In a specific exemplary aspect, as illustrated in FIG. 6, a circuit configuration may be made in which a plurality of output power maximization circuit 30 and a plurality of voltage adjustment converters 40 are provided to correspond to respective two or more secondary battery units 20.

A specific description is given of an example of the "aspect in which a plurality of secondary battery units share one voltage adjustment converter" below from a viewpoint of describing the present disclosure. However, the basic concept, function, and the like are the same as in the "aspect in which each of a plurality of secondary battery units has a one-to-one corresponding voltage adjustment converter".

Figure 1:
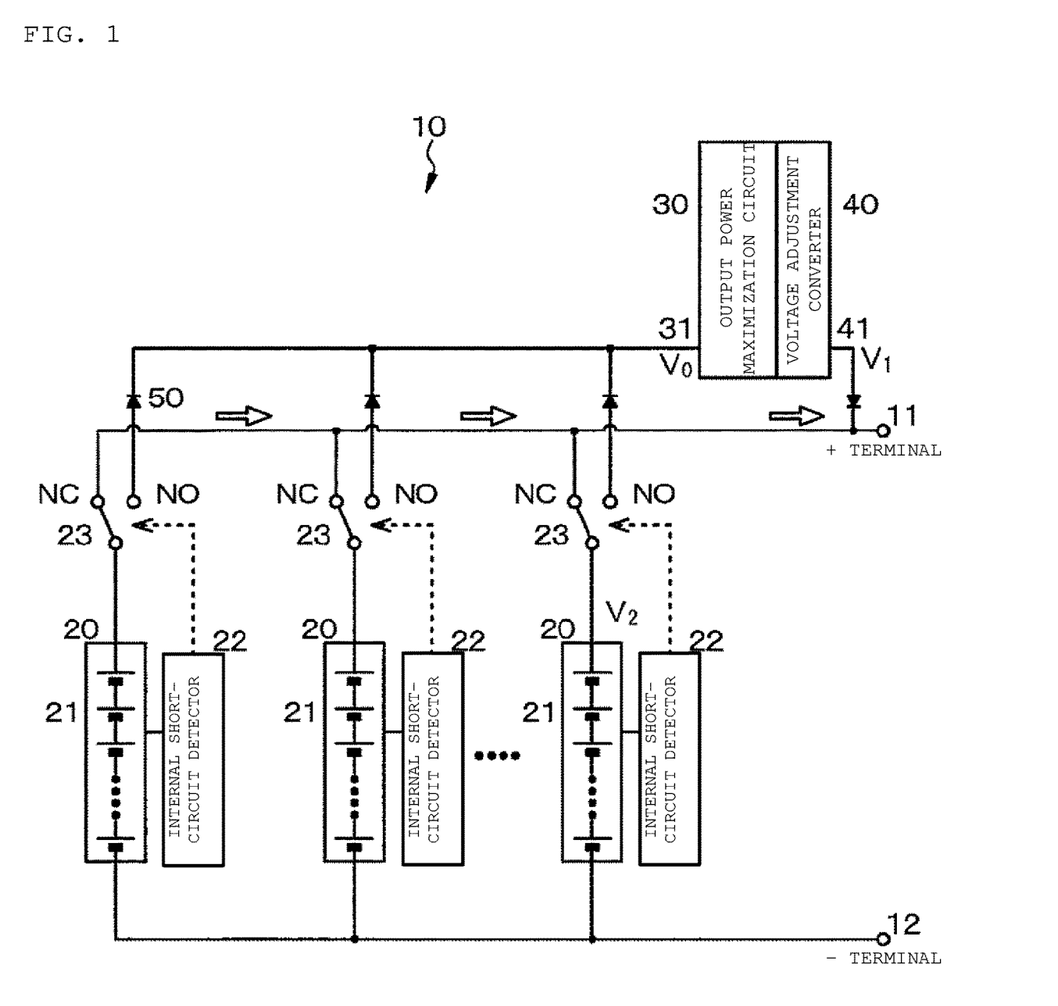
FIG. 1 is a diagram illustrating a circuit configuration during normal operation of a battery pack charge/discharge control device according to an embodiment of the present disclosure.
Figure 2:
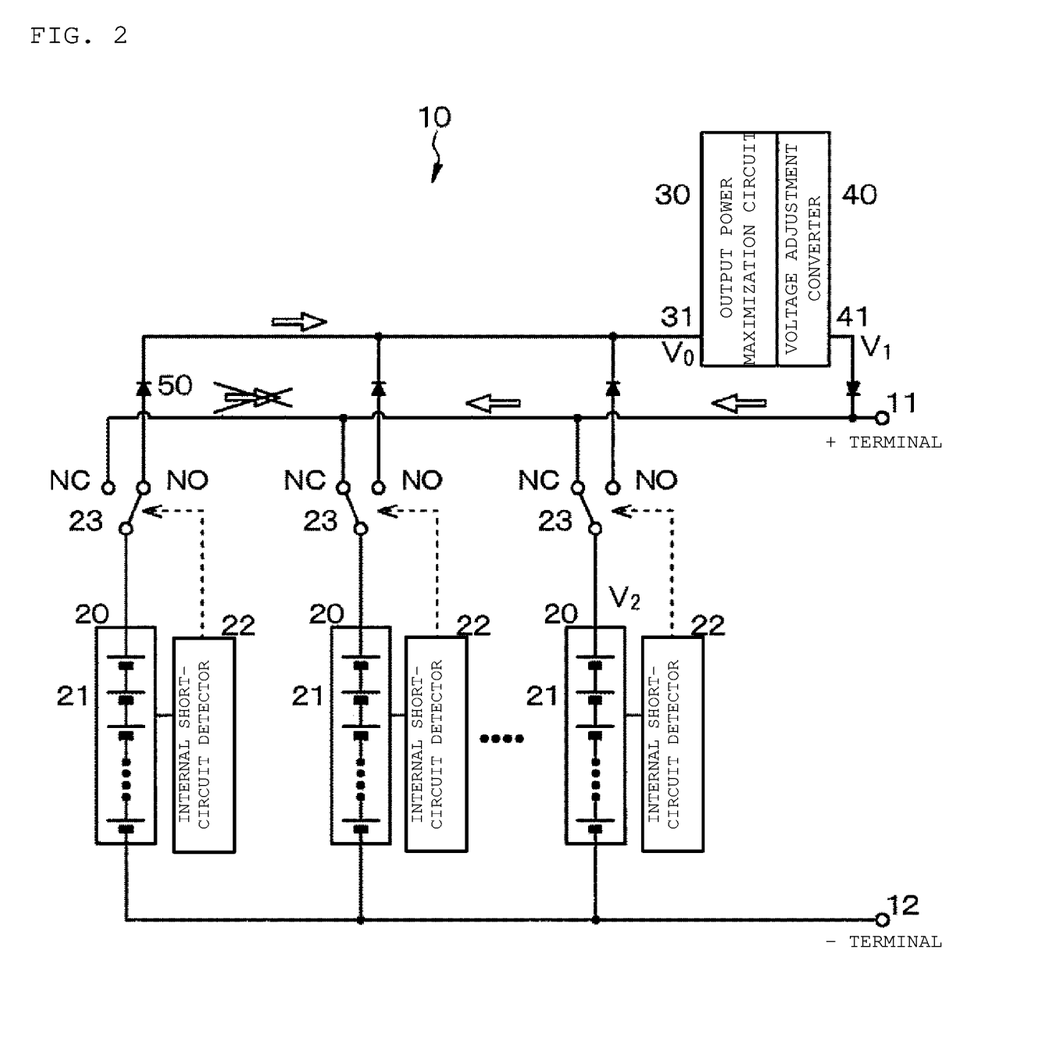
FIG. 2 is a diagram illustrating a circuit configuration in which a secondary battery unit of a battery pack charge/discharge control device according to an embodiment of the present disclosure is in an internal short-circuit state.
Figure 3:
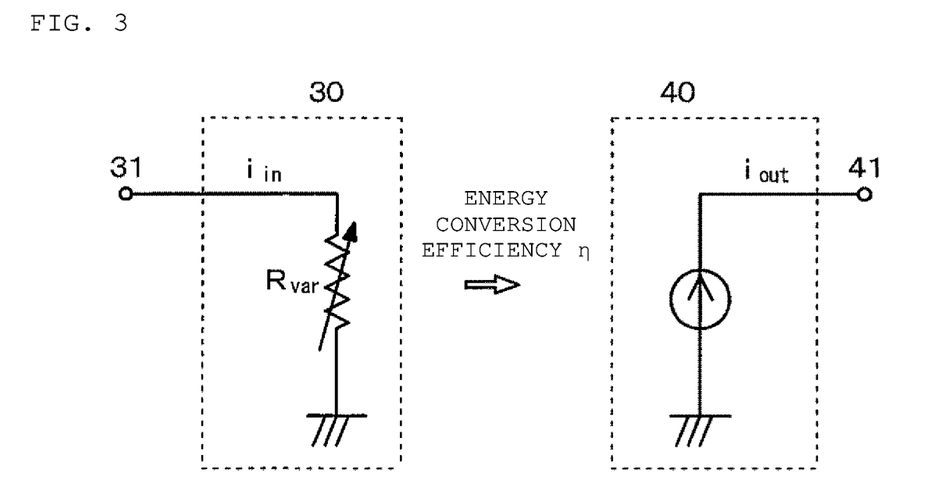
FIG. 3 is an equivalent circuit diagram of output power maximization circuit and a voltage adjustment converter according to an embodiment of the present disclosure.

FIG. 1 illustrates a circuit configuration of the battery pack charge/discharge control device of the present disclosure during normal operation, and FIG. 2 illustrates a circuit configuration in which a secondary battery unit of the battery pack charge/discharge control device illustrated in FIG. 1 is in the internal short-circuit state. Moreover, FIG. 3 illustrates an equivalent circuit diagram of output power maximization circuit and a voltage adjustment converter.

As illustrated in FIGS. 1 and 2, in the battery pack charge/discharge control device according to a preferred aspect, a plurality of secondary battery units can share the output power maximization circuit and the voltage adjustment converter. Meanwhile, each secondary battery unit individually includes the internal short-circuit detector and the switch means.

Figure 5A:
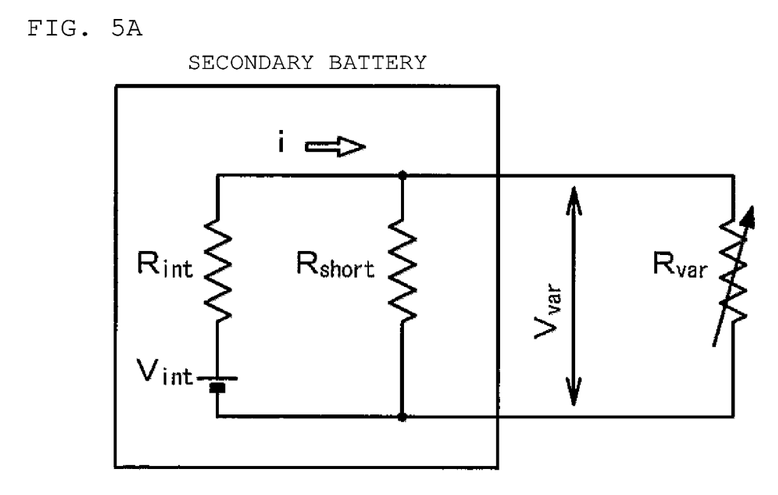
FIGS. 5A and 5B are equivalent circuit diagrams of a secondary battery and a solar cell, respectively, according to an embodiment of the present disclosure.
Figure 5B:
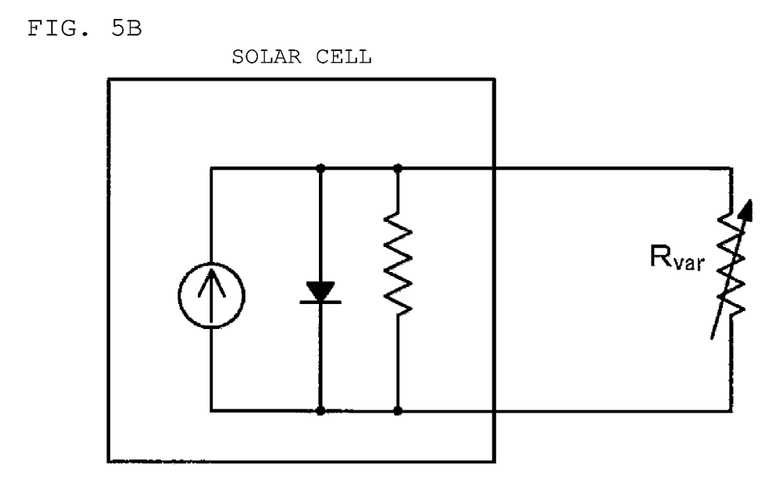

Incidentally, as illustrated in FIGS. 5A and 5B, control for maximizing the power flowing in a short-circuit path includes MPPT control that maximizes the amount of power generation of a power generation device, such as a solar cell or a fuel cell. Then, currently, an MPPT control function-equipped voltage adjustment converter has been commercially available. The inventor of the present application has found through earnest study that such a voltage adjustment converter is used, not to extract the energy from a solar cell, but to extract the released energy from the secondary battery unit in the internal short-circuit state so that the released energy of the secondary battery in the internal short-circuit state can be efficiently extracted to the outside.

A battery pack charge/discharge control device 10 illustrated in FIGS. 1 and 2 is a battery pack charge/discharge control device 10 including a battery pack in which two or more secondary battery units 20 each including one secondary battery 21 or two or more secondary battery units 20 each including a plurality of secondary batteries 21 connected in series (in the illustrated example, a secondary battery unit 20 including a plurality of secondary batteries 21 connected in series) are connected in parallel. Then, the battery pack charge/discharge control device 10 includes output power maximization circuit 30 that maximizes output power based on the input power, and a voltage adjustment converter 40 that adjusts the output voltage from the output power maximization circuit 30. Here, each secondary battery unit 20 includes internal short-circuit detector 22 that detects an internal short-circuit state of the secondary battery unit 20, and switch means 23 that switches an output destination of the secondary battery unit 20, in which the switch means 23, based on a result of detection by the internal short-circuit detector 22, connects an output portion of the secondary battery unit 20 in the internal short-circuit state to an input portion 31 of the output power maximization circuit 30.

The internal short-circuit detector 22 includes temperature detection means, specifically, for example, a thermistor that detects the temperature of each secondary battery 21 constituting the secondary battery unit 20. Note that it may be a thermistor that detects the temperature of the secondary battery unit 20. Alternatively, the internal short-circuit detector 22 may include voltage measurement means (voltmeter) that measures the voltage of the secondary battery unit 20 or the voltage of the secondary battery 21 constituting the secondary battery unit 20. Alternatively, the internal short-circuit detector 22 may include current measurement means (current meter) that measures the current of the secondary battery unit 20. Moreover, the switch means 23 may include an electromagnetic relay or a solid state relay (SSR). In the illustrated example, the output power maximization circuit 30 and the voltage adjustment converter 40 are integral, but are not limited thereto, and may be separate components. Preferably, a diode 50 is arranged between the output power maximization circuit 30 and the switch means 23 and between the voltage adjustment converter 40 and the output portion 11 of the battery pack to prevent backflow of current.

It is assumed that internal short circuit has occurred in a secondary battery unit 20 (more specifically, a secondary battery 21 constituting the secondary battery unit 20) for some reason in the state illustrated in FIG. 1 where the switch means 23 is in a normally close (NC) state and output of the secondary battery unit 20 is output from an output portion (+ terminal) 11 and an output portion (− terminal) 12 of the battery pack (battery pack charge/discharge control device 10) in normal operation. At this time, the internal short-circuit detector 22 including a thermistor that monitors the temperature of the secondary battery unit 20 (alternatively the temperature of each secondary battery 21) detects an increase in temperature of the secondary battery unit 20 (alternatively the temperature of each secondary battery 21), and, under the control by the battery pack charge/discharge control device 10, the switch means 23 is turned into a normally ooen (NO) state (see FIG. 2). That is, the switch means 23, based on the results of the detection by the internal short-circuit detector 22 (particularly, based on the results of the detection by the internal short-circuit detector 22 provided to each secondary battery unit 20, i.e., based on the results of the detection regarding each secondary battery unit 20), connects the output portion of the secondary battery unit 20 in the internal short-circuit state to the input portion 31 of the output power maximization circuit 30. The power of the secondary battery unit 20 in the internal short-circuit state flows into the output power maximization circuit 30.

The output power maximization circuit 30 has a maximum power point tracking (MPPT) control function. Alternatively, the output power maximization circuit 30 includes a hill climbing MPPT circuit. Specifically, the output power maximization circuit 30 measures voltage V' input to the output power maximization circuit 30 and current i' flowing into the output power maximization circuit 30. Voltage is V'(1) and current is i'(1) at a certain point of time $t=t_1$, power at this time is P(1), and value of variable resistance value $R_{var}$ of a variable resistor illustrated in FIG. 3 is R(1). After a lapse of a certain period of time, voltage is V'(2) and current is i'(2) at time $t=t_2$, and power at this time is P(2). Here, in the case of V'(2)<V'(1) and P(2)>P(1), or in the case of V'(2)>V'(1) and P(2)<P(1), value R(2) of the variable resistance value $R_{var}$ of the variable resistor of the output power maximization circuit 30 is changed (controlled) to R(2)<R(1). Meanwhile, in the case of V'(2)<V'(1) and P(2)<P(1), or in the case of V'(2)>V'(1) and P(2)>P(1), value R(2) of the variable resistance value $R_{var}$ is changed (controlled) to R(2)>R(1). In the case of P(2)=P(1), value R(2) of the variable resistance value $R_{var}$ is not changed.

The voltage input to the output power maximization circuit 30 is adjusted by the voltage adjustment converter 40 at energy conversion efficiency η, and the resulting voltage is output from the output portion 41 of the voltage adjustment converter 40. For example, the voltage input to the output power maximization circuit 30 is boosted by the voltage adjustment converter 40 provided as a boost converter, and the resulting voltage is output from the output portion 41 thereof. In this way, even when the value of the voltage or the current input to the output power maximization circuit 30 is varied, the power output from the voltage adjustment converter 40 can be maximized. Part of the released energy of the secondary battery unit 20 in the internal short-circuit state (ideally, in impedance matching state, up to 50% of the released energy of the secondary battery unit 20 in the internal short-circuit state) is thus output from the voltage adjustment converter 40. Meanwhile, although the other part of the released energy of the secondary battery unit 20 in the internal short-circuit state is converted into heat, because the energy of the secondary battery unit 20 output from the voltage adjustment converter 40 is maximized, it is possible to reduce the energy converted into heat in the secondary battery unit 20 in the internal short-circuit state.

In the aspect illustrated in FIGS. 1 and 2, the output portion 41 of the voltage adjustment converter 40 is connected to the output portion 11 of the battery pack. Then, as illustrated in FIG. 2, the secondary battery unit 20 not in the internal short-circuit state is charged by the output power from the voltage adjustment converter 40. At this time, the output voltage ($V_1$) of the voltage adjustment converter 40 is equal to (or substantially equal to) the voltage ($V_2$) of the secondary battery unit 20 not in the internal short-circuit state. In practice, in consideration of impedance of the circuit, the relationship of $V_1 > V_2$ or $V_1 \geq V_2$ is satisfied. Thus, part of the released energy of the secondary battery unit 20 in the internal short-circuit state can be used effectively. Note that part of the released energy of the secondary battery unit 20 in the internal short-circuit state is output to the outside via the output portion 11 of the battery pack depending on circumstances.

The secondary battery unit 20 in the internal short-circuit state connected to the input portion 31 of the output power maximization circuit 30 may be disconnected from the battery pack under a predetermined condition. Specifically, the secondary battery unit 20 in the internal short-circuit state is disconnected from the battery pack when the value of the input power to the output power maximization circuit 30 of the secondary battery unit in the internal short-circuit state is a predetermined value or less. More specifically, for example, when the energy of the secondary battery unit 20 in the internal short-circuit state is depleted, the switch means 23 of the secondary battery unit 20 may remain in the NO state, or the switch means may be brought into a third state, which is not illustrated, other than the NC state and the NO state, and the secondary battery unit 20 may be disconnected from the battery pack.

Moreover, the output portion 41 of the voltage adjustment converter 40 may be connected to the outside of the battery pack instead of being connected to the output portion 11 of the battery pack. Thus, the maximized power of the secondary battery unit in which the internal short circuit has occurred can be extracted to the outside of the battery pack so as to be used for a different intended purpose not for the battery pack, and alternatively the maximized power may not be effectively used in an aspect (even in such a case, because the amount of heat generation in the secondary battery unit in which short circuit has occurred can be reduced maximally, the risk of fuming or fire of the secondary battery unit in which short circuit has occurred can be reduced).

In consideration of a short-circuit path including the secondary battery unit in the internal short-circuit state, when a resistance value in the short-circuit path is excessively high, the current flowing in the short-circuit path is reduced. Therefore, the amount of energy generation Q in the short-circuit path becomes small. Meanwhile, when the resistance value in the short-circuit path is excessively low, because the amount of energy generation Q in the short-circuit path is proportional to the resistance value ($Q=R \cdot I^2$), the amount of energy generation becomes small eventually. That is, the resistance value in the short-circuit path has an optimal value that maximizes the amount of energy generation. Thus, in consideration of the short-circuit path, it is desirable that a resistor in the short-circuit path be a variable resistor to perform control such that the resistance value is always an optimal value. Even if control cannot be made such that the resistance value is always an optimal value, it is necessary, at minimum, to understand conceivable a minimum resistance value and a maximum resistance value and perform designing such that the resistance value of the resistor falls within such a range.

Then, based on the MPPT control, it is possible to maximize the amount of energy (aforementioned amount of energy generation) extracted from the secondary battery in the internal short-circuit state. If the operation of the MPPT control is ideal, the amount of heat generation is suppressed up to 50%. This is because the MPPT-controlled state and the impedance matching state are electrically equivalent and the efficiency of energy transfer in the impedance matching state is exactly 50%. Moreover, the extracted energy is consumed by being charged into the secondary battery of the secondary battery unit not in the internal short-circuit state. That is, when the internal short circuit occurs in the secondary battery in a secondary battery unit, the residual energy of the secondary battery at that time in which the internal short circuit has occurred is rapidly and efficiently extracted, and the extracted energy is consumed by being charged into the secondary battery constituting another secondary battery unit of the battery pack. Thus, it is possible to suppress the amount of heat generation of the battery pack as a whole.

Commercially available MPPT control function-equipped voltage adjustment converters include those involving short time before reaching a maximum power point and those involving extremely long time before reaching a maximum power point. In order to correspond to an internal resistance value or a short-circuit resistance value that varies from moment to moment after occurrence of short circuit, it is preferable to select an MPPT control function-equipped voltage adjustment converter that can operate at high speed as far as possible. For example, it is also possible to obtain an MPPT control function-equipped voltage adjustment converter that reaches the maximum power point in about 100 milliseconds. Considering that it typically takes a few seconds to a few tens of seconds to reach fuming and fire from short circuit of a secondary battery in nail penetration test, updating the maximum power point with respect to each 100 milliseconds is understood to be sufficient as time resolution.

Among performance requirements required for the hill climbing MPPT circuit constituting the output power maximization circuit, the strictest requirement is input current value. Its concept is described below.

It is considered how to express variable resistance value (external resistance value) $R_{var}$ of the variable resistor that maximally extracts the residual energy of the secondary battery by using internal resistance value $R_{int}$ and short-circuit resistance value $R_{short}$ in a case where an equivalent circuit of the secondary battery in the internal short-circuit state is FIG. 5A. First, it can be expressed as follows by Kirchhoff's current law and voltage law.

$$I=(V_{var}/R_{short})+(V_{var}/R_{var}) \quad (1)$$

$$V_{int}=\{R_{int}+(R_{short} \cdot R_{var})/(R_{short}+R_{var})\} \cdot i \quad (2)$$

Formula (2) is substituted into Formula (1) to remove i, and the formula is solved for $V_{var}$ as follows.

$$V_{var}=(R_{short} \cdot R_{var})V_{int}/(R_{int} \cdot R_{short}+R_{short} \cdot R_{var}+R_{var} \cdot R_{int}) \quad (3)$$

Thus, heat generation (i.e., energy that can be extracted to the outside) $Q_{var}$ at the variable resistance value $R_{var}$ can be expressed as follows.

$$Q_{var} = V_{var}^2 / R_{var} \qquad (4)$$
$$= (R_{short2} \cdot R_{var})V_{int2} /$$
$$(R_{int} \cdot R_{short} + R_{short} \cdot R_{var} + R_{var} \cdot R_{int})^2$$

Here, the condition of the variable resistance value $R_{var}$ under which $Q_{var}$ takes an extreme value on condition that the variable resistance value $R_{var}$ satisfies Formula (5):

$$(\partial Q_{var})/(\partial R_{var})=0.$$

Formula (4) is differentiated with respect to the variable resistance value $R_{var}$, and the formula is rearranged with respect to the variable resistance value $R_{var}$ as follows.

$$R_{var}=(R_{int} \cdot R_{short})/(R_{int}+R_{short}) \quad (6)$$

(provided that a relationship of $V_{int} \neq 0$ is satisfied)

At the moment, it is not yet determined whether $Q_{var}$ becomes a local maximum value or a local minimum value when the condition of Formula (6) is satisfied. In order to make a determination, $Q_{var}$ is differentiated twice.

$$(\partial^2 Q_{var})/(\partial R_{var}^2)$$
$$=\{2R_{short}^2(R_{int}+R_{short})(-2R_{int} \cdot R_{short}+R_{short} \cdot R_{var}+R_{var} \cdot R_{int})\} \cdot V_{int}^2/(R_{int} \cdot R_{short}+R_{short} \cdot R_{var}+R_{var} \cdot R_{int})^4 \quad (7)$$

Incidentally, because the resistance value is always a positive physical amount, when positive and negative of the term of the right side ($-2 R_{int} \cdot R_{short}+R_{short} \cdot R_{var}+R_{var} \cdot R_{int}$) of Formula (7) can be determined, positive and negative of twice differentiation of $Q_{var}$ can be determined and it can be determined whether $Q_{var}$ protrudes upward or protrudes downward, and thus it becomes clear whether it is a local maximum or a local minimum.

Here, proof by contradiction is used to determine that the following Formula (8) is true.

$$-2R_{int} \cdot R_{short}+R_{short} \cdot R_{var}+R_{var} \cdot R_{int} > 0 \quad (8)$$

When Formula (8) is deformed, the following Formula (9) is obtained.

$$R_{var}\{(R_{int}+R_{short})/(R_{int} \cdot R_{short})\}-2>0 \qquad (9)$$

(provided that a relationship of $R_{int} \neq 0$ and $R_{short} \neq 0$ is satisfied)

When Formula (6) is substituted into Formula (9), the following Formula (10) is obtained and this is inconsistent.

$$1-2>0 \qquad (10)$$

That is, Formula (8) is false, and value of $-2R_{int} \cdot R_{short}+R_{short} \cdot R_{var}+R_{var} \cdot R_{int}$ is always negative under the condition that Formula (6) is satisfied. Accordingly, a twice differentiation of $Q_{var}$ is also negative, $Q_{var}$ protrudes upward, and thus the variable resistance value $R_{var}$ of Formula (6) is the local maximum point of $Q_{var}$.

As a conclusion from the above, in order to maximally extract the residual energy of the secondary battery in the internal short-circuit state to the outside, it is sufficient that the internal resistance value $R_{int}$ and the short-circuit resistance value $R_{short}$, which vary from moment to moment, are obtained, the variable resistance value $R_{var}$ is calculated using Formula (6), and the variable resistance value $R_{var}$ is sequentially adjusted to the obtained calculation value. However, the internal resistance value $R_{int}$ or the short-circuit resistance value $R_{short}$ is not a directly obtainable value. Accordingly, it is sufficient that the internal resistance value $R_{int}$ is estimated from, for example, the measured temperature, and the short-circuit resistance value $R_{short}$ is estimated, for example, from a short-circuit situation and a known curve (see, for example, Shinya SUDO, et al. "Study of nail penetration test on lithium ion battery (1)—short circuit resistance analysis—," The 57th Battery Symposium proceedings, FIG. 3 of 1C19 (2016)) is applied.

Next, a qualitative relationship between the variable resistance value $R_{var}$, the internal resistance value $R_{int}$, and the short-circuit resistance value $R_{short}$ is studied. Formula (6) can be deformed into a formula below (provided that a relationship of $R_{int} \neq 0$ is satisfied).

$$R_{var}=R_{short}(1-R_{var}/R_{int}) \qquad (11)$$

Here, because the resistance value is always a positive physical amount, the value of the variable resistance value $R_{var}$ of the left side is always positive, and the value of the short-circuit resistance value $R_{short}$ of the first term of the right side is also always positive. Thus, the second term of the right side must be positive, and the following inequality is established.

$$1-R_{var}/R_{int}>0 \qquad (12)$$

Here, the formula is deformed in consideration of the fact that the internal resistance value $R_{int}$ is also always positive, the following relationship is obtained.

$$R_{var}<R_{int} \qquad (13)$$

That is, it is determined that the variable resistance value $R_{var}$ must be always smaller than the internal resistance value $R_{int}$. Note that, in Formula (6), the internal resistance value $R_{int}$ and the short-circuit resistance value $R_{short}$ cannot be distinguished from each other. Therefore, the relationship of $R_{var}<R_{short}$ must also be established at the same time. Thus, an upper limit value of the variable resistance value $R_{var}$ can be determined as follows.

$$R_{var}<\min[R_{int},R_{short}] \qquad (14)$$

Incidentally, in the case of $R_{int} \leq R_{short}$, the following relationship is established from Formula (6).

$$R_{int}/2 \leq (R_{int} \cdot R_{short})/(R_{int}+R_{short}) \leq R_{short}/2 \qquad (15)$$

In the case of $R_{short} \leq R_{int}$, the following relationship is established from Formula (6).

$$R_{short}/2 \leq (R_{int} \cdot R_{short})/(R_{int}+R_{short}) \leq R_{int}/2 \qquad (16)$$

When Formula (15) and Formula (16) are combined, it is possible to determine a lower limit value of the variable resistance value $R_{var}$. The upper limit and the lower limit are written in one formula as follows (provided that an equal sign holds when a relationship of $R_{int}=R_{short}$ is satisfied).

$$\min[R_{int},R_{short}]/2 \leq R_{var} < \min[R_{int},R_{short}] \qquad (17)$$

Next, the way of determining maximum value $\max_t[R_{var}(t)]$ and minimum value $\min_t[R_{var}(t)]$ in a variable range of the variable resistance value $R_{var}$ is considered. This is because, in order to practically design an electronic circuit of MPPT control, it is necessary to determine a maximum value and a minimum value as to in what range the value of the variable resistance value $R_{var}$ is variable.

In order to correctly determine the maximum value and the minimum value, correct behaviors of $R_{int}(t)$ and $R_{short}(t)$, which are functions of time of the internal resistance value $R_{int}$ and the short-circuit resistance value $R_{short}$, are preliminarily understood and are required to be calculated using Formula (6). However, the behavior of $R_{int}(t)$ or $R_{short}(t)$ is reproducible at low level in the first place, and therefore, in practice, it is difficult to correctly understand the behavior preliminarily.

Thus, as a realistic method for determining a sufficient variable range, use of Formula (17) is considered. First, regarding the maximum value of the variable resistance value $R_{var}$, a maximum value of the upper limit value of Formula (17) is sufficient. Furthermore, considering what is short-circuit resistance, immediately before short-circuit (t=0), the relationship of $R_{int}(t)<R_{short}(t)$ must be satisfied, and based on the assumption that the temperature monotonically increases after short circuit, in the case of the assumption that the internal resistance value $R_{int}(t)$ monotonically decreases, the maximum value of the upper limit value in Formula (17) is equal to $R_{int}(0)$. That is, the following Formula (18) is satisfied.

$$\text{The sufficient maximum value}=\max_t\{\min[(R_{int}(t), R_{short}(t)]\}=R_{int}(0) \qquad (18)$$

Regarding the minimum value of the variable resistance value $R_{var}$, a minimum value of the lower limit value of Formula (17) is sufficient. The following Formula (19) is obtained.

$$\text{The sufficient minimum value} = \min_t\{\min[R_{int}(t), R_{short}(t)]/2\} = \{\min(\min_t[R_{int}(t), \min_t R_{short}(t)])\}/2 \qquad (19)$$

Regarding the minimum value, it is no longer necessary to consider the behaviors of $R_{int}(t)$ and $R_{short}(t)$ simultaneously, and it can be seen that it is sufficient that the minimum values are considered separately and the smaller value is further set to a halved value. To summary, the following can be said.

(A) It is sufficient that the maximum value of the variable resistance value $R_{var}$ is set to the internal resistance value $R_{int}(0)$ before short circuit.

(B) Regarding the minimum value of the variable resistance value $R_{var}$, it is sufficient that the minimum value of the internal resistance value $R_{int}(t)$ and the minimum value of the short-circuit resistance value $R_{short}(t)$ are considered separately and the smaller value is set to a halved value.

Figure 4:
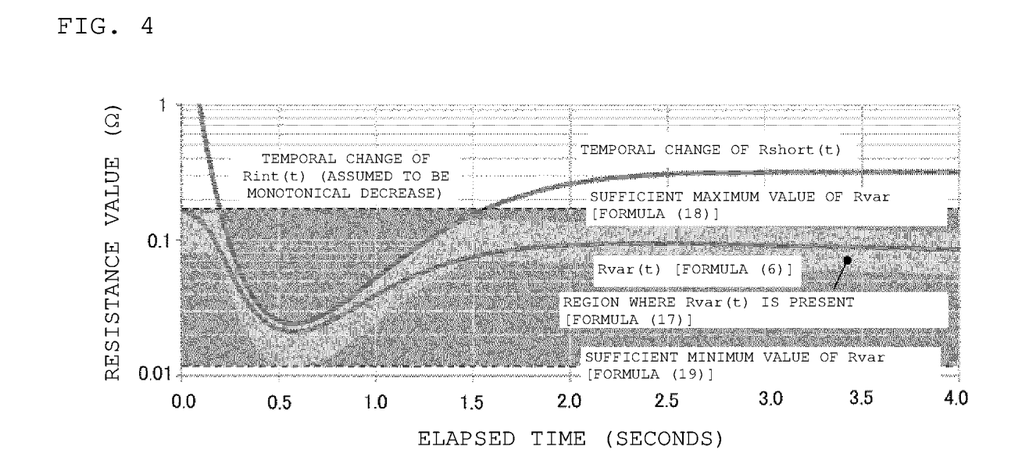
FIG. 4 is a graph illustrating a variable range without deficiency or excess of variable resistance values (external resistance values) $R_{var}$ indicated by Formulae (6), (17), (18) and (19) according to an embodiment of the present disclosure.

This conclusion is illustrated in FIG. 4.

Next, performance requirements of input current required for the MPPT control function-equipped voltage adjustment converter are described. Considering that the equivalent circuit of the MPPT control function-equipped voltage adjustment converter can be described as in FIG. 3, in order to extract the maximum energy from the secondary battery in the internal short-circuit state, it is necessary to suck up current $i_{in}(t)$ indicated in Formula (20) below from the secondary battery unit in the internal short-circuit state (see Formula (6)).

$$i_{in}(t) = V_{in}(t)/R(t) \quad (20)$$
$$= V_{in}(t) \cdot \{R_{int}(t) + R_{short}(t)\} / \{R_{int}(t) \cdot R_{short}(t)\}$$

Because it is difficult to simultaneously take into consideration the internal resistance value $R_{int}(t)$ and the short-circuit resistance value $R_{short}(t)$, a formula (Formula (19)) of the minimum value with sufficient R(t) described above in order to take into account separately is used to re-express Formula (20), and the following Formula (21) is obtained.

$$\text{The sufficient maximum input current} = 2V_{in}(t)\{\min[\min_t R_{int}(t), \min_t R_{short}(t)]\} \quad (21)$$

In selecting an MPPT control function-equipped voltage adjustment converter, it is sufficient to take into consideration a required sufficient current value.

As an example, a numerical value is practically substituted into Formula (21) to calculate what degree of value the input current value becomes. If each secondary battery unit includes one lithium ion secondary battery, the full charge voltage is 4.2 volts and thus $V_{in}(t)$ is 4.2 volts. A 18650-type cylinder cell has an internal resistance of about 50 milliΩ. If this value is adopted, the relationship of $R_{int}(t)=0.05$ is satisfied, and, regarding the short-circuit resistance value, based on nail penetration, the minimum value is considered to be about 50 milliΩ with reference to the aforementioned "Study of nail penetration test on lithium ion battery (1)— short circuit resistance analysis—," The 57th Battery Symposium proceedings, FIG. 3 of 1C19 (2016). Thus, $R_{short}(t)$ is also 0.05. When the aforementioned values are substituted into Formula (21), the current value becomes 168 amperes. Accordingly, it is sufficient to select an MPPT control function-equipped voltage adjustment converter that can correspond to input current of about 200 amperes to allow some leeway.

As described above, in the battery pack charge/discharge control device of the present disclosure, the output portion of the secondary battery unit in the internal short-circuit state is connected to the input portion of the output power maximization circuit, and the input power is turned into the maximum output power by the output power maximization circuit and is input to the voltage adjustment converter. As a result, the energy released by the secondary battery unit in the internal short-circuit state is efficiently output from the voltage adjustment converter, and it is possible to reduce the amount of heat generated by the secondary battery unit in the internal short-circuit state, and it is possible to effectively use the energy output from the voltage adjustment converter.

In the circuits illustrated in FIGS. 1 and 2, the plurality of secondary battery units can share the output power maximization circuit and the voltage adjustment converter. However, as illustrated in FIG. 6, each of the plurality of secondary battery units may individually include the output power maximization circuit and the voltage adjustment converter. That is, in the battery pack charge/discharge control device of the present disclosure, the "aspect in which each of the plurality of secondary battery units has a one-to-one corresponding voltage adjustment converter" may be realized.

In the battery pack charge/discharge control device according to the aspect, as illustrated in FIG. 6, each secondary battery unit 20 includes the internal short-circuit detector 22 that detects the internal short-circuit state of the secondary battery unit, the output power maximization circuit 30 and the voltage adjustment converter 40 are provided to each secondary battery unit 20, and, based on the results of the detection by the internal short-circuit detector 22 (particularly, the results of the detection by the internal short-circuit detector 22 provided to each secondary battery unit 20), among the output power maximization circuit 30 of the secondary battery units 20, the output maximization means 30 of the secondary battery unit 20 in the internal short-circuit state operates.

As can be seen from the configuration illustrated in FIG. 6, in such a circuit configuration, it is not particularly necessary to separately provide the switch means to each secondary battery unit 20.

Also, in such aspect, when short circuit occurs in one of the two or more secondary battery units, the output power maximization circuit of the unit in which short circuit has occurred can maximize the output power based on the input power of the short-circuited unit, and the voltage adjustment converter of the short-circuited unit can adjust the output voltage from the output power maximization circuit to a desired voltage. In other words, among the plurality of output power maximization circuit and the plurality of voltage adjustment converters, the output power maximization circuit and the voltage adjustment converter of the secondary battery unit in which internal short circuit has occurred are separately operated to maximize the energy extracted from the secondary battery unit in which short circuit has occurred.

Here, the output voltage of the voltage adjustment converter of the secondary battery unit in which short circuit has occurred can, for example, be equal to (or substantially equal to) the voltage of the secondary battery unit not in the internal short-circuit state as described above. Thus, similarly, in the "aspect in which each of the plurality of secondary battery units has a one-to-one corresponding voltage adjustment converter," without depending on variations in value of the voltage or current input to the output power maximization circuit of the secondary battery unit in the short-circuit state, the power output from the voltage adjustment converter provided on each of the units is extracted at a desired voltage. In other words, even in the "aspect in which each of the plurality of secondary battery units has a one-to-one corresponding voltage adjustment converter," similar to the aforementioned "aspect in which the plurality of secondary battery units share one voltage adjustment converter," part of the released energy of the secondary battery unit 20 in the internal short-circuit state (ideally, in an impedance matching state, up to 50% of the released energy of the secondary battery unit 20 in the internal short-circuit state) is output from the voltage adjustment converter 40, and it is possible to reduce the energy converted into heat by the secondary battery unit 20 in the internal short-circuit state accordingly. The power output from the voltage adjustment converter 40 of the secondary battery unit 20 in the internal short-circuit state may be used for charging a sound secondary battery unit not in the internal short-circuit state or may be extracted to the outside of the battery pack.

As can be seen from the above description and the circuit configuration of FIG. 6, similarly when the internal short circuit occurs in the "aspect in which each of the plurality of secondary battery units has a one-to-one corresponding voltage adjustment converter," a secondary risk such as fuming and fire caused by the short circuit can be reduced, and it is possible to effectively maximally use the energy of the secondary battery unit in the internal short-circuit state.

As a mere example, the "aspect in which each of the plurality of secondary battery units has a one-to-one corresponding voltage adjustment converter" is suitable for intended purposes such as a power source for a server. For example, the battery pack charge/discharge control device of the present disclosure can be preferably used for an uninterruptible power system (UPS) or the like.

It should be understood that, particularly, in the "aspect in which each of the plurality of secondary battery units has a one-to-one corresponding voltage adjustment converter", each secondary battery unit and the voltage adjustment converter provided to each secondary battery unit may be integral with each other. That is, in the battery pack charge/discharge control device of the present disclosure, even when the plurality of voltage adjustment converters are provided, the voltage adjustment converters may be integrally modularized with the secondary battery units. This is preferable in terms of general versatility for application of the present disclosure into various intended purposes. For example, some server power device or the like has a device configuration based on integration of the secondary battery unit with the voltage adjustment converter. The battery pack charge/discharge control device of the present disclosure may be preferably used for such intended purpose.

Heretofore, the present disclosure has been described based on the preferred aspects, but the present disclosure is not limited to such aspects. The configurations and structures of the aforementioned battery pack charge/discharge control device, and the various numerical values and the like described in the examples are mere examples, but are not limitative and can be changed appropriately.

For example, the aforementioned preferred aspect refers to the example in which the voltage adjustment converter 40 is a boost converter and the maximum output power from the output power maximization circuit 30 is boosted by the converter. However, the present disclosure is not necessarily limited thereto. In the charge/discharge controlled battery pack of the present disclosure, the voltage adjustment converter may be a step-down converter. For example, taking the circuit configuration of the battery pack charge/discharge control device illustrated in FIG. 6 as an example, the voltage of each secondary battery unit is reduced and used in some cases. In such a case, the voltage adjustment converter of each secondary battery unit can at least have the function of the step-down converter. Moreover, from a different viewpoint, the following configuration can be possible in which when, for example, at least two of the plurality of secondary battery units that can be adjusted in voltage by the converter have mutually different voltages, depending on the maximum energy extracted from the secondary battery unit in which short circuit has occurred, the maximum output power from its power maximization means is stepped down by the step-down converter so as to be equal to or substantially equal to the voltage of the output portion of another sound secondary battery unit (particularly, the output portion of the voltage adjustment converter provided on the sound battery unit).

The present technology is described below in further detail according to an embodiment.

[A01] <<Battery pack charge/discharge control device>>

A battery pack charge/discharge control device in which, as a battery pack, two or more secondary battery units each formed of one secondary battery or two or more secondary battery units each formed of a plurality of secondary batteries connected in series are connected in parallel, the battery pack charge/discharge control device including:

an output power maximization circuit configured to maximize output power based on an input power; and a voltage adjustment converter configured to adjust an output voltage from the output power maximization circuit, in which among the two or more secondary battery units, an output power of the secondary battery unit in which a short circuit state has occurred is maximized.

[A02] The battery pack charge/discharge control device according to [A01], in which each secondary battery unit includes:

an internal short-circuit detector configured to detect an internal short-circuit state of the secondary battery unit; and switch means configured to switch an output destination of the secondary battery unit, and the switch means, based on a result of detection by the internal short-circuit detector, connects an output portion of the secondary battery unit in the internal short-circuit state to an input portion of output maximization means.

[A03] The battery pack charge/discharge control device according to [A01], in which each secondary battery unit includes:

an internal short-circuit detector configured to detect an internal short-circuit state of the secondary battery unit, an output power maximization circuit and a voltage adjustment converter are provided to each secondary battery unit, and based on a result of detection by the internal short-circuit detector, among the output power maximization circuit of the secondary battery units, output maximization means of a secondary battery unit in the internal short-circuit state operates.

[A04] The battery pack charge/discharge control device according to any of [A01] to [A03], in which an output portion of the voltage adjustment converter is connected to an output portion of the battery pack.

[A05] The battery pack charge/discharge control device according to any of [A01] to [A04], in which by the output power from the voltage adjustment converter, the secondary battery unit not in the internal short-circuit state is charged.

[A06] The battery pack charge/discharge control device according to any of [A01] to [A05], in which the output voltage of the voltage adjustment converter is equal to a voltage of the secondary battery unit not in the internal short-circuit state.

[A07] The battery pack charge/discharge control device according to any of [A01] to [A06],
in which
an output portion of the voltage adjustment converter is connected to an outside of the battery pack.

[A08] The battery pack charge/discharge control device according to any of [A01] to [A07],
in which
the voltage adjustment converter is a boost converter.

[A09] The battery pack charge/discharge control device according to any of [A01] to [A07],
in which
the voltage adjustment converter is a step-down converter.

[A10] The battery pack charge/discharge control device according to any of [A01] to [A09], in which
the output power maximization circuit has a maximum power point tracking control function.

[A11] The battery pack charge/discharge control device according to any of [A01] to [A09], in which
the output power maximization circuit includes a hill climbing MPPT circuit.

[A12] The battery pack charge/discharge control device according to any of [A01] to [A11], in which the output power maximization circuit and the voltage adjustment converter are integral.

[A13] The battery pack charge/discharge control device according to any of [A01] to [A12], in which
the secondary battery unit in the internal short-circuit state connected to an input portion of the output power maximization circuit is disconnected from the battery pack under a predetermined condition.

[A14] The battery pack charge/discharge control device according to any of [A01] to [A13], in which
the internal short-circuit detector includes temperature detection means.

[A15] The battery pack charge/discharge control device according to any of [A01] to [A13], in which
the internal short-circuit detector includes voltage measurement means configured to measure a voltage of the secondary battery unit or a voltage of the secondary battery constituting the secondary battery unit.

[A16] The battery pack charge/discharge control device according to any of [A01] to [A13], in which
the internal short-circuit detector includes current measurement means configured to measure a current of the secondary battery unit.

[A17] The battery pack charge/discharge control device according to any of [A01] to [A16], in which
the switch means includes an electromagnetic relay or a solid state relay.

[A18] The battery pack charge/discharge control device according to any of [A04] to [A17] depending from [A03], in which
the secondary battery units and the voltage adjustment converters provided to the secondary battery units are integral with each other.

The battery pack charge/discharge control device of the present disclosure can be used for various intended purposes in which a so-called "battery pack" is used. As a mere example, it may be used for the purpose of a power source for a server or may be used for intended purposes such as a drive power source for mobile means typified by a four-wheeled vehicle, a two-wheeled vehicle, an automobile, and an aircraft.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A battery pack charge/discharge control device configured to charge/discharge a battery pack including two or more secondary battery units connected in parallel, the battery pack charge/discharge control device comprising:
an output power maximization circuit configured to maximize output power based on an input power; and
a voltage adjustment converter configured to adjust an output voltage from the output power maximization circuit,
wherein an output power of a secondary battery unit in the two or more secondary battery units connected in parallel that has occurred an internal short circuit is maximized, and
wherein each secondary battery unit includes:
an internal short-circuit detector configured to detect an internal short-circuit state of the secondary battery unit; and
a switch configured to switch an output destination of the secondary battery unit, and
the switch based on a result of detection by the internal short-circuit detector, is configured to connect an output portion of the secondary battery unit in the internal short-circuit state to an input portion of the output power maximization circuit.

2. The battery pack charge/discharge control device according to claim 1,
wherein
each secondary battery unit includes:
the internal short-circuit detector configured to detect the internal short-circuit state of the secondary battery unit,
the output power maximization circuit, and
the voltage adjustment converter, and
wherein the output power maximization circuit of the secondary battery unit in the internal short-circuit state operates based on the result of detection by the internal short-circuit detector.

3. The battery pack charge/discharge control device according to claim 2, wherein
the secondary battery units and the voltage adjustment converters provided to the secondary battery units are integrated with each other.

4. The battery pack charge/discharge control device according to claim 1,
wherein
an output portion of the voltage adjustment converter is connected to an output portion of the battery pack.

5. The battery pack charge/discharge control device according to claim 4,
wherein
by the output power from the voltage adjustment converter, a secondary battery unit not in the internal short-circuit state is charged.

6. The battery pack charge/discharge control device according to claim 5,
wherein
the output voltage of the voltage adjustment converter is equal to a voltage of the secondary battery unit not in the internal short-circuit state.

7. The battery pack charge/discharge control device according to claim 1,
wherein
an output portion of the voltage adjustment converter is connected to an outside of the battery pack.

8. The battery pack charge/discharge control device according to claim 1,
wherein
the voltage adjustment converter includes a boost converter.

9. The battery pack charge/discharge control device according to claim 1,
wherein
the voltage adjustment converter includes a step-down converter.

10. The battery pack charge/discharge control device according to claim 1, wherein
the output power maximization circuit has a maximum power point tracking control function.

11. The battery pack charge/discharge control device according to claim 1, wherein
the output power maximization circuit includes a hill climbing MPPT circuit.

12. The battery pack charge/discharge control device according to claim 1, wherein the output power maximization circuit and the voltage adjustment converter are integrated.

13. The battery pack charge/discharge control device according to claim 1, wherein
the secondary battery unit in the internal short-circuit state connected to an input portion of the output power maximization circuit is disconnected from the battery pack under a predetermined condition.

14. The battery pack charge/discharge control device according to claim 1, wherein
the internal short-circuit detector is configured to perform temperature detection.

15. The battery pack charge/discharge control device according to claim 1, wherein
the internal short-circuit detector includes a voltage meter configured to measure a voltage of the secondary battery unit or a voltage of the secondary battery constituting the secondary battery unit.

16. The battery pack charge/discharge control device according to claim 1, wherein
the internal short-circuit detector includes a current meter configured to measure a current of the secondary battery unit.

17. The battery pack charge/discharge control device according to claim 1, wherein
the switch includes an electromagnetic relay or a solid state relay.

* * * * *